Figure 1:
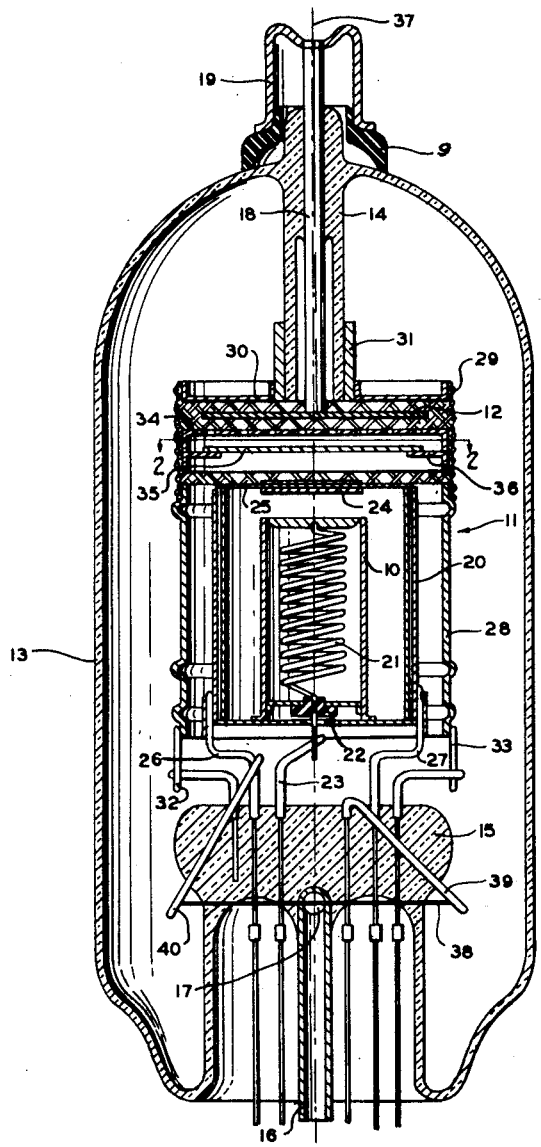

Aug. 15, 1950     K. J. GERMESHAUSEN     2,518,879
HYDROGEN THYRATRON

Filed Feb. 3, 1945     2 Sheets-Sheet 1

*INVENTOR.*
KENNETH J. GERMESHAUSEN
BY William D. Hall.
ATTORNEY

Aug. 15, 1950  K. J. GERMESHAUSEN  2,518,879
HYDROGEN THYRATRON

Filed Feb. 3, 1945  2 Sheets-Sheet 2

INVENTOR.
KENNETH J. GERMESHAUSEN

BY
William D. Hall,
ATTORNEY

Patented Aug. 15, 1950

2,518,879

UNITED STATES PATENT OFFICE 2,518,879

HYDROGEN THYRATRON

Kenneth J. Germeshausen, Newton Center, Mass., assignor, by mesne assignments, to the United States of America as represented by the Secretary of War Application February 3, 1945, Serial No. 576,113

18 Claims. (Cl. 250—27.5)

The present invention relates broadly to grid controlled, gaseous rectifier tubes, and more particularly to structural arrangements for such tubes of the hydrogen filled type and circuit applications therefor.

Various designations have been attached to tubes of the grid controlled, gaseous rectifier type. For the purpose of simplicity in this description, these tubes will hereinafter be identified as a gas-filled triode.

The gas-filled triode is essentially an electronic switch having an internal impedance that is either very high, corresponding to an open switch, or very low, corresponding to a closed switch, depending on the grid potential, although it cannot be opened by the same means as it was closed, viz., the grid. The gas-filled triode has two voltage limits; the maximum peak inverse voltage it will tolerate without passing current in the reverse direction, and the maximum forward voltage that the grid will block so as to prevent forward current or "shoot-through." The ability of the tube to withstand inverse voltage is a function of the geometry of the electrodes, the current passed, and the internal gas pressure. In general, sharp corners or other sources of high voltage gradient must be guarded against in the design of a tube for high voltage.

Triodes having helium, neon or some other inert gas or mixture of gases, the pressure of the gas varies in proportion to the absolute temperature. In mercury vapor tubes, however, the vapor pressure doubles roughly with every 10 degrees centigrade increase, so that as the temperature of the glass walls increases thereby increasing the saturated vapor pressure of mercury, the arc back limit of the tube decreases.

The maximum instantaneous anode current that a gas-filled triode is capable of passing without harm depends upon the temperature and dimensions of the cathode surface and the pressure of the gas. If the rated value is exceeded, a destructive ion bombardment of the cathode will occur and, in consequence, the tube life will be shortened.

Where a tube is intended for use as a high voltage, high current switch, such as employed in connection with pulse modulators, the choice of gas is based on two factors, namely the maximum operating anode voltage for a given gas pressure, and the minimum destruction of the cathode from positive ion bombardment. Hydrogen was found to be most desirable for this purpose, being greatly superior to helium in terms of cathode life although helium allows the highest anode voltage for a given gas pressure, and hydrogen filled tubes could be filled to a high enough pressure so that reduction of gas pressure, or gas "clean up," with time, was not serious.

The time after a gas-filled triode tube has ceased passing current, until the ionization has disappeared sufficiently to restore control to the grid, is known as the deionization time. It has been found that hydrogen gives a tube a rapid recovery time after an abrupt change in anode voltage, that is, it ionizes and deionizes rapidly. Moreover, the tube has a high efficiency because of the relatively low internal impedance of a hydrogen filled triode during conduction, and the operating characteristics are substantially independent of ambient temperature.

Accordingly, it is the principal object of this invention to provide an improved structure for a gas-filled triode in general, and for a hydrogen filled triode in particular whereby it is adapted for high voltage, high current switching operation such as required in pulse modulators.

It is another object of this invention to provide such a tube structure wherein the spacing between elements is maintained despite their thermal expansion.

An additional object of this invention is to provide a hydrogen-filled triode free of hydrogen clean-up phenomenon.

Yet another object of this invention is to provide an improved cathode construction for a gas-filled triode.

Still another object of this invention is to provide a structural design for a hydrogen-filled triode in which long path discharges are prevented.

An additional object of this invention is to provide a pulse modulator circuit incorporating a hydrogen-filled triode in accordance with the present invention.

Figure 2:
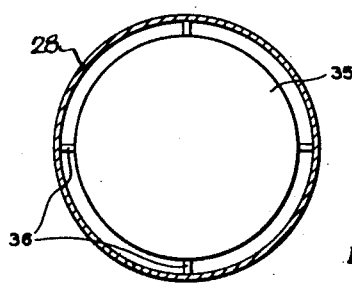
Figure 3:
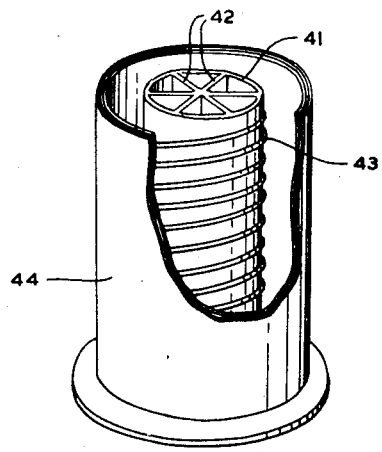
Figure 4:
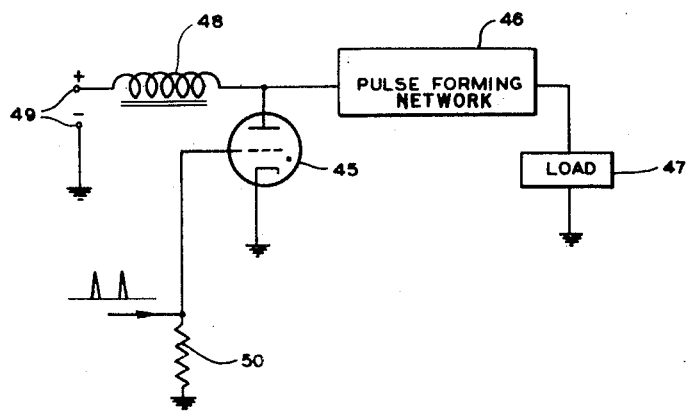

For a better understanding of the invention as well as other objects and features thereof, reference is had to the following description to be read in connection with the accompanying drawings wherein, Figure 1 is a vertical axial cross section taken through a preferred embodiment of a gas-filled triode constructed in accordance with the invention, Figure 2 is a plan view taken along line 1—1 in Figure 1, Figure 3 is a cross-sectional view of an improved cathode construction in accordance with the invention, and Figure 4 is a schematic diagram of a pulse modulator circuit incorporating the invention.

Referring now to the drawings and more particularly to Figure 1, there is shown in vertical cross-section a preferred embodiment of a three-element tube comprising a cathode 10, a grid 11 and an anode 12, these elements being contained within a glass envelope 13 having formed on the dome thereof an elongated glass neck 14; the lower end of the envelope is provided with a reentrant glass press 15.

The envelope 13 is filled with hydrogen under pressure and sealed off by means of a glass tube 16 communicating with the envelope through an aperture 17 in the reentrant portion of glass press 15. The anode 12 takes the shape of a metal disc, and is centrally supported by means of a wire stem 18 which is coaxially received within glass neck 14 and terminated in an anode cap 19 mounted on a ceramic pedestal 9, cemented over the projection of neck 14.

The cathode 10 assumes the form of a drum externally coated with emissive material, the drum being positioned concentrically within, and secured to the bottom of, a double layer heat shield can 20. Connected to the upper metallic cover of cathode drum 10 is one end of a helical filament 21, the other end extending through the metallic covers at the bottoms of the cathode and heat-shield cylinders and through a grommet insulator 22, whereupon it is connected to a wire support 23 embedded in the glass press 15.

Partially covering the upper circular opening of the heat shield can 20 is a disc-shaped, double-baffle 24 supported by a single narrow strut 25 extending across the opening and whose ends are welded to the upper edge of can 20. Can 20 is mounted on two wire supports 26 and 27 welded to opposing points on the circumference of the lower end thereof and set into the glass press 15.

The grid structure 11 surrounds both anode 12 and cathode 10 and the entire structure being designed to prevent long path discharges. This is accomplished by making the anode-to-grid spacing substantially less than the mean free path in the gas at the pressure employed. Moreover, the grid forms a complete closure around the anode in which no discharge paths exist which are greater in length than the minimum grid-to-anode spacing. Discharges between the anode inlead 18 and the outside of grid structure 11, the lower part of which also forms a complete closure around the cathode, are prevented by surrounding the anode inlead by a glass sleeve 14, the latter acting as a physical barrier for any possible long-path discharges between the grid-cathode structure and the anode. Grid structure 11 includes a metal cylinder 28, having expansion bellows formed thereon, and a wire mesh cylinder 29 directly coupled thereto. Wire mesh cylinder 29 makes it possible to observe the operation of the tube and also facilitates the cooling of anode 12. The grid structure is held at its upper end by an annular disc 30, the rim thereof being flanged and bonded to the inner surface of wire mesh cylinder 29. disc 30 being centrally secured to glass neck 14 by a metal collar 31. The lower end of the grid structure is attached to two supporting wires 32 and 33, welded at opposing points on the periphery of metal cylinder 28 and embedded in glass press 15.

The grid diaphragm 34 is in the form of a flanged, foraminated disc which may be perforated with holes preferably about $\frac{1}{16}$ inch in diameter. Grid diaphragm 34 is mounted securely within wire mesh cylinder 29, being interposed in position between anode 12 and a disc-baffle 35, the latter being mounted below the diaphragm 34 and fixed in position by four evenly-spaced, radially extending struts 36, each welded to the inner surface of the flange of grid diaphragm 34.

This arrangement is illustrated in Fig. 2 where disc-baffle 35 and struts 36 are seen along line 1—1 of Fig. 1. It is evident that electrons emitted from cathode 10 must travel around the outer edges of baffle 35 before they can be drawn through the grid diaphragm 34 to anode 12. The baffle 35, therefore, serves four purposes: (1) It makes the tube a positive grid controlled device (2) it decreases the number of ions bombarding the anode on the inverse cycle by preventing ions in the grid-cathode region from reaching the anode if alternating current is employed for anode potential (3) it minimizes radiation of heat from the cathode to the anode, and (4) it prevents the migration of barium from the cathode 10 to the grid 34 and shields the grid 34 from the radiant cathode heat, thereby preventing grid contamination and emission difficulties. The advantage of having positive grid control lies in the fact that zero grid bias may be used, and the tube will not break down, grid current flow being required to trigger the tube on.

The entire structure of the tube is symmetrical and concentric with respect to the vertical axis 37. To provide conventional electrode terminals, the supporting wires 23, 26, 27 and 33 are connected by means of leads to the prongs of the tube base, not shown.

Incorporated in the tube is a Pirani gauge for the purpose of measuring the gas pressure therein. The gauge consists of a filament 38 connected between a supporting wire 39 embedded in the press 15 and a supporting wire 40 attached to and extending laterally from supporting wire 26. As is known, by passing a slight heating current through filament 38, the electrical resistance of the filament will vary with the temperature thereof. The filament 38, being cooled by the ambient gas, varies in resistance as a function of gas pressure. Thus by translating the resistance measurement in terms of pressure, a direct pressure reading may be obtained. A lead connected to wire support 39 affords one terminal for the Pirani gauge, the lead connected to wire support 26 also serving as the other terminal of the gauge.

The anode-grid structure is so arranged that a close spacing in the order of 0.1 inch or less can be maintained from anode 12 to grid diaphragm 34, this spacing being substantially less than the mean free path in hydrogen at the pressure used. With this structure anode voltages as high as 20 kilovolts may be employed with a gas pressure around 500 microns of mercury.

It is important that spacing between anode 12 and grid diaphragm 34 be closely maintained despite the thermal expansion of the various tube components occurring in operation. If the grid structure 11 were mounted rigidly to the bottom of the tube, differential expansion between the supports and the glass tube walls would alter the grid-anode spacing and hence change the tube characteristics. This disadvantage is averted in the present invention by the fact that glass neck 14 supports both anode 12 and grid diaphragm 34, the expansion bellows on metal cylinder 28 permitting ample freedom of motion of the grid structure 11.

In the matter of voltage breakdown, as mentioned herein above, long path discharges are prevented by the construction of the tube. Simply stated, this means that there should be no continuous conductive paths extending in length greater than or equal to the mean free path of the gaseous system. To prevent long path discharges from occurring between the upper portion of the lead 18, where it is sealed into the glass 14, and the disc 30 a collar 31 is provided which creates a radial electric field between anode stem 18 and grid structure 11 over the lower portion of the stem; hence long, continuous field gradients cannot exist between the upper end of the stem and the support disc 30. Thus collar 31 performs a dual function, one of which is to act as a physical support for the grid, and the other is to create favorable fields distributions between the anode lead 18 and the upper portion 30 of the grid.

A preferred material for construction of the anode electrode has been found to be molybdenum, the use of which reduces sputtering. The other metallic components of the tube may be made of nickel, which should be preferably pure nickel for avoiding hydrogen clean-up phenomenon discussed below.

Of utmost importance in producing hydrogen filled triodes having long life is the removal of substances which can combine with hydrogen to produce products that can poison the cathode and also deplete the hydrogen in the tube. This applies particularly to carbon, or any oxides on the metal parts, or such impurities within the metal itself. In the disclosed tube gas "clean up" has been avoided by a soaking procedure and by eliminating additional detrimental factors which will be discussed later. Hydrogen is absorbed by heating the parts in a hydrogen atmosphere. Another important precaution is that the barium oxide of the cathode must not be reduced to free barium, or reaction of free barium with hydrogen will occur, since free barium will react with molecular hydrogen to produce barium hydride.

Moreover, the use of extremely pure electrolytically refined nickel as the cathode base metal has been found to be important. The usual "Grade A" nickel employed in known cathode constructions contains in varying amounts such reducing agents as magnesium, manganese, or silicon, which will react with the cathode coating to produce free barium, which in turn will combine with molecular hydrogen as has been stated above.

Other impurities in nickel poison cathode; others, which release water or hydrocarbons, or cause metallic film on the bulb, promote adsorption. Accordingly, the disclosed cathode 10 is made of extremely pure, electrolytically refined nickel. The electrolytically refined nickel is manufactured by the International Nickel Company and is known as Electrolytic Nickel #1001. The precise quantitative chemical analysis of this nickel is not known, but it is known to contain approximately 99.9% of nickel and cobalt, and traces of Fe, Mn, Cu, C, Si, S, and Mg. The controlling factor, and the reason why only this type of nickel may be used for making cathode, is that only traces of the reducing agents are present in this type of nickel, and therefore no significant depletion of hydrogen atmosphere can take place because of the reaction between free hydrogen and these reducing agents. The use of this type of nickel may be extended to the shields, grid and anode structures if high operating temperatures for all elements are anticipated. To prevent the previously mentioned production of free barium, the maximum operating cathode temperature must not exceed 875° C., which means lower average cathode temperature since during the pulse the cathode temperature rises. The application of a triple carbonate material for cathode emitters 45% barium oxide, 45% strontium oxide, 10% calcium oxide is not new in general, having been used in the past to prevent grid contamination, but it serves a new and extremely useful purpose in the present invention in that the calcium prevents the production of free barium, and as a result prevents hydrogen "clean up."

Another factor causing hydrogen "clean up" is adsorption of the gas on the glass surfaces of the tube. This adsorption is promoted by the presence of atomic hydrogen near the glass and by voltage gradients existing near the glass surfaces. Designs which reduce the quantity of atomic hydrogen near glass surfaces will greatly reduce gas loss due to this cause. This adsorption can also be prevented by maintaining the glass surfaces at temperatures of the order of 200° C. In the disclosed tube this is accomplished by providing heat shields which completely envelop the cathode except for electron passages, and by enveloping the entire cathode-anode structure with the grid.

Ceramic insulators in the disclosed structure are used very sparingly since they act as unstable reservoirs, soaking up and releasing hydrogen in a detrimental manner. However hydrogen lends itself to the use of a reservoir to replenish the gas within the tube since there are numerous compounds and semicompounds of hydrogen such as tantalum hydride, palladium hydride, calcium hydride, which have definite vapor pressures and will release hydrogen if the pressure of the gas within the tube falls below the vapor pressure of the compound used.

Cathode construction in Thyratrons is critical in nature because of the necessity of maintaining the cathode temperature within rather narrow limits. As stated above the maximum cathode temperature should not exceed 875° C. since above this temperature hydrogen will react with the cathode coating directly without the aid of any previously mentioned reducing agents (impurities in nickel cathode sleeve 10). The end result of this phenomenon is to cause the oxide cathode coating to leave the cathode 10 and be deposited on the cooler portions of the tube structure in its original form. The result of this reaction is not, as might be expected, the formation of water vapor and free barium, strontium and calcium, but a gradual transfer of these oxides to the cooler surfaces of the tube, free hydrogen acting as agent in this transfer. The minimum cathode temperature is limited to about 800° C. since below this temperature the cathode emission falls off rapidly, hence the operating temperature range is only about 75° C. The maintenance of this narrow temperature range can be accomplished most readily by the use of indirectly heated cathodes which are capable of having more uniform temperature over the entire cathode surface. In Figure 1, a suitable indirectly heated cathode 10 is illustrated which performs the sought results.

Owing to the comparatively slow migration of the ions during extremely short applied pulses of voltage to the anode, it has been empirically learned that the ratio of the diameter of shield can 20 divided by the diameter of cathode 10 to the length of cylinder 28 should be as large as feasible or only the upper portion of the cathode is effectively used during a short pulse, the lower portion supplying but little current.

Heat shielding, as is known, contributes to the efficiency of the tube. Fig. 3 illustrates an improved cathode design. This construction provides the equivalent of a large ratio as above described. The cathode is in the form of a cylinder 41 having six radial vanes 42 diposed therein (only three vanes are visible in the cross-sectional view), the vane's length being approximately equal to the length of the cylinder. The active emitting area of the cathode consists in the surface of vanes 42 and the inner surface of cylinder 41. A helical heater 43 is wound around the cathode cylinder 41 and the cathode is disposed concentrically within a double layer heat shield can 44. Positioning of the heater element on the outer surface of the cathode cylinder 41 permits the use of the inner volume of the cylinder entirely for constructing an efficient electron-emitting surface having large open spaces adjacent to the emitting surface, inside the cathode cylinder, for obtaining effective ionization of hydrogen throughout the depth or length of the anode cylinder.

The present invention has many applications and will be illustrated herein as employed in connection with a modulator for producing rectangular pulses of high amplitude.

Referring now to Figure 4, there is illustrated a modulator circuit comprising a hydrogen-filled triode 45, a pulse forming network 46, such as an artificial transmission line, a load 47, such as a magnetron oscillator, and a choke 48. The cathode of Thyratron 45 is connected to ground, as is the negative terminal of a high voltage supply 49, and one end of load 47. The positive terminal of high voltage supply 49 is connected through choke 48 and pulse forming network 46 to the other side of load 47, the anode of triode 45 being connected at the junction of network 46 and choke 48.

The grid of triode 45 is connected through a resistor 50 to ground, and positive triggering pulses are applied directly to the grid. Since triode 45 is a positive grid-control tube, a heavy negative grid bias is not required to prevent firing thereof, and, in the absence of a triggering pulse, the tube is nonconductive. When a triggering pulse is applied to the control grid of the triode, this triggering pulse being, in the modulators of this type, synchronized with the appearance of the maximum charge on the artificial line 46, triode 45 is rendered conductive causing the pulse forming network 46 to discharge through load 47, the resultant pulse being suitably shaped by the network. Choke 48 impedes the discharge of network 46 across the power source 49.

It is, of course, obvious that there are many other circuits in which the tube may be employed. The positive control feature allows great flexibility in the design of these circuits.

Moreover, it can be seen by one versed in the art that although what has been described in the foregoing specification is a preferred embodiment of the invention, departures may be made from the specific form of the invention as disclosed without deviating from the invention itself. For example, cylinder 29 might be formed of perforated sheet metal instead of wire mesh, whereas grid diaphragm 34 might be constructed of wire mesh rather than a perforated sheet, or the manner of supporting the electrodes need not be exactly as described. These alterations and substitutions are cited only as examples, it being aimed in the appended claims to cover all such changes and modifications as fall within the true spirit and scope of the invention.

What is claimed is:

1. An electron discharge device comprising a glass envelope having an ionizable atmosphere therein, said envelope having an elongated reentrant glass neck formed on the dome thereof, a cathode within said envelope for emitting electrons, an anode for receiving said electrons, a metallic stem coaxially maintained within said glass neck for centrally supporting said anode, a control electrode enveloping said cathode and anode and having a foraminated inner member segregating said cathode and anode electrodes whereby an electron discharge takes places through said member, the spacing between said foraminated member and said anode being less than the mean free path of electrons in the ionizable medium of said device, and means, including a collar, received over said neck for supporting said control electrode.

2. An electron discharge device comprising a glass envelope having an ionizable atmosphere therein, said envelope having an elongated reentrant neck formed on the dome thereof, a cathode within said envelope for emitting electrons, a heat shield disposed about said cathode, an anode for receiving said electrons, a metallic stem coaxially maintained within said glass neck for centrally supporting said anode, a control electrode surrounding said cathode and anode, said control electrode having bellows formed thereon and having a foraminated inner member segregating said cathode and anode, the spacing between said member and said anode being less than the mean free path of electrons in the ionizable medium, and means, including a metal collar, received over said glass neck for supporting said control electrode in fixed relationship with respect to said anode.

3. An electron discharge device comprising a glass envelope having an ionizable atmosphere therein, said envelope having an elongated reentrant neck formed on the dome thereof, a cathode within said envelope for emitting electrons, a heat shield disposed about said cathode, an anode for receiving said electrons, a conductive stem connected to said anode and passing through said neck, a control electrode enveloping said cathode and anode and having a foraminated member separating said cathode and anode and a baffle between said member and said cathode.

4. An electron discharge device comprising a glass envelope having an ionizable atmosphere therein, said envelope having a reentrant neck formed on the dome thereof, a cathode within said envelope for emitting electrons, a heat shield disposed about said cathode, an anode for receiving said electrons, a metallic stem maintained within said neck for supporting said anode, a control electrode surrounding said cathode and anode and supported by said neck, said control electrode having a foraminated member separating said cathode from said anode, the spacing between said member and said anode being less than the mean free path of electrons in the ionizable medium of said device, and a disc-shaped baffle maintained between said perforated surface and said cathode, the surface of said baffle being smaller than that of said member.

5. An electron discharge device comprising an envelope, a cathode within said envelope for emitting electrons, an anode for receiving said electrons, and a control electrode surrounding said cathode and enveloping said anode and having an inner foraminated member separating said cathode from said anode, said cathode comprising a hollow cylinder with the bottom end of said cylinder closed and the top end open, a plurality of radial vanes within said cylinder, the side wall of said cylinder and the surfaces of said vanes being coated with an electron-emitting material, a heater coil surrounding the side wall of said cylinder, and a heat shield surrounding the side and bottom walls of said cylinder and said heater.

6. In a thermionic tube, an indirectly heated cathode, said cathode comprising a metallic cylinder, a plurality of radial baffles mounted within said cylinder, the side walls of said cylinder and the surfaces of said baffle being coated with an electron-emitting medium, a heater coil wound around the outer surface of said cylinder, and a heat shield surrounding the side wall and the bottom of said cathode cylinder, said cathode cylinder and said heater coil being supported by said heat shield.

7. A gas-filled triode comprising a cylindrical glass envelope having a glass press at one end and a reentrant glass stem at the other end, a gaseous medium within said envelope, an indirectly heated cathode, a heat shield surrounding the side wall and bottom of said cathode, said cathode and shield being supported by said press, an annode supported by said stem, a grid, the lower portion of said grid surrounding the side wall of said heat shield and the upper end extending beyond said anode, a first metallic plate connected to said stem and to the upper end of said grid whereby said grid is supported by said stem, and a second foraminated plate mounted inside said grid between said cathode and said anode whereby said anode is completely enveloped by an envelope formed by said first and second plates and a portion of the grid wall between said plates, the distance between said anode and the inner surface of said envelope being less than the mean free path of electrons in the gaseous medium of said triode.

8. A gas-filled triode as defined in claim 7 in which the length of said shield is greater than the length of said cathode, whereby said shield extends beyond the top end of said cathode, and a disc baffle held in spaced relationship with respect to said top end of said cathode, and a gaseous gap between said shield and said disc baffle.

9. A gas-filled triode as defined in claim 7 in which said cathode, heat shield and said grid comprise three spaced, concentric cylinders, said anode and said first and second plates are three spaced, coaxial discs having a common center line with said cylinders with the plane of any one of said discs being perpendicular to said axis, and which further includes a plurality of spaced disc baffles between said cathode and said second plate, said baffles being centered on said axis and lying in planes parallel to the planes of said first and second plates.

10. A gaseous discharge triode having an envelope, an anode, a grid, and a cathode all mounted within said envelope, said cathode having an indirectly heated shell made of pure nickel having only traces of reducing agents, and an electron-emitting coating on said shell, and a hydrogen atmosphere within said envelope.

11. A gaseous discharge triode having a glass envelope, an anode, a grid, and a cathode all mounted within said envelope, heat shields surrounding said cathode, said cathode having an indirectly heated shell and an electron-emitting coating on said shell, said heat shields and said cathode shell being made of pure nickel having only traces of reducing agents, and a hydrogen atmosphere within said envelope.

12. A gaseous discharge triode comprising, a glass envelope, structural elements of said triode within said envelope, said structural elements including an anode, a grid, an indirectly heated cathode, and heat shields surrounding said cathode, said structural elements being made of pure nickel having only traces of reducing agents.

13. A gaseous discharge triode including a glass envelope, an anode, a grid, and a cathode all mounted within said envelope, said cathode having an indirectly heated shell made of pure nickel having only traces of reducing agents, a hydrogen atmosphere within said envelope, and a free-of-residual-carbonates, electron-emitting coating of barium oxide, strontium oxide and calcium oxide on said shell.

14. A gaseous discharge triode including, a glass envelope, an anode, a grid, and a cathode mounted within said envelope, said cathode being made of pure nickel having only traces of reducing agents, a hydrogen atmosphere free of water vapor within said envelope, and a free-of-residual-carbonates, electron-emitting coating of barium oxide, strontium oxide, and calcium oxide mounted on said cathode.

15. In a gaseous discharge triode, an anode, a thermionic cathode comprising a cylindrical member and an electron-emitting coating on said member, a cylindrical heat shield in spaced relationship and coaxially surrounding said cathode, said heat shield being open at the end adjacent to said anode, a grid element, and a disc baffle coaxially mounted at the open end of said heat shield, said baffle being of larger diameter than said cathode.

16. In a gaseous discharge triode, a plate anode, a cylindrical cathode in spaced relationship with respect to said anode, a cylindrical heat shield surrounding and in concentric relationship with said cathode, the end of said cylindrical shield adjacent to said anode having an opening equal to the inner diameter of said shield, a first disc baffle concentrically mounted with said opening, a cylindrical grid surrounding said shield and said anode, and a second disc baffle mounted within said cylindrical grid in concentric relationship with respect to said cathode and said grid and between said first baffle and said anode, said second baffle having a diameter substantially larger than said cathode and substantially smaller than said grid cylinder.

17. A line pulse modulator comprising, a series circuit of a source of potential, an impedance, an artificial line, and means interconnecting said modulator with a load, and a hydrogen-filled triode shunting said artificial line and said means.

18. In a keying circuit for a transmitter, a series circuit including a source of potential, a choke coil, an artificial line, and a coupling means; said coupling means electrically coupling said series circuit to said transmitter, and said source of potential periodically charging said artificial line; a hydrogen-filled triode having a grid, an anode, and a cathode, the cathode-anode circuit of said triode shunting said artificial line and said coupling means, and a source of pulses connected to the grid of said triode for rendering said hydrogen-filled triode conductive.

KENNETH J. GERMESHAUSEN.

REFERENCES CITED

The following references are of record in the file of this patent:

UNITED STATES PATENTS

| Number | Name | Date |
|---|---|---|
| 1,962,159 | La Van | June 12, 1934 |
| 2,032,179 | Lowry | Feb. 25, 1936 |
| 2,106,847 | Kniepkamp | Feb. 1, 1938 |
| 2,112,591 | Gessford et al. | June 21, 1938 |
| 2,166,817 | Maser | July 18, 1939 |
| 2,192,162 | Kniepkamp | Feb. 27, 1940 |
| 2,396,807 | Watrous, Jr. | Mar. 19, 1946 |
| 2,399,003 | Crapuchettes | Apr. 23, 1946 |

FOREIGN PATENTS

| Number | Country | Date |
|---|---|---|
| 502,534 | Great Britain | Mar. 15, 1939 |